United States Patent [19]
Schneider

[11] Patent Number: 6,001,912
[45] Date of Patent: Dec. 14, 1999

[54] ACRYLIC-BASED AQUEOUS ADHESIVE

[75] Inventor: Karen M. Schneider, Manitou Beach, Mich.

[73] Assignee: K2, Inc., Adrian, Mich.

[21] Appl. No.: 09/132,627

[22] Filed: Aug. 11, 1998

[51] Int. Cl.[6] .............................. C08L 3/20; C08K 3/26; C08K 5/05; C08K 3/34; C09J 133/08
[52] U.S. Cl. ................ 524/388; 524/186; 524/390; 524/425; 524/474; 524/493; 523/122
[58] Field of Search ............................ 524/388, 425, 524/474, 390, 186, 493; 523/122

[56] References Cited

U.S. PATENT DOCUMENTS

| | | | |
|---|---|---|---|
| 5,082,881 | 1/1992 | Saeki et al. | 523/511 |
| 5,190,997 | 3/1993 | Lindemann et al. | 524/44 |
| 5,442,001 | 8/1995 | Jones et al. | 524/292 |
| 5,610,215 | 3/1997 | Nonweiler et al. | 524/376 |
| 5,679,732 | 10/1997 | Van Rheenen | 524/21 |
| 5,721,302 | 2/1998 | Wood et al. | 524/271 |
| 5,886,071 | 3/1999 | Hariharan | 523/546 |

*Primary Examiner*—Vasu Jagannathan
*Assistant Examiner*—Callie E. Shosho
*Attorney, Agent, or Firm*—Donald R. Fraser

[57] ABSTRACT

An acrylic-based aqueous adhesive comprises acrylic polymer, propylene glycol, calcium carbonate, organic defoamer, biocide, hydrocarbon solvent, thickener, sand, and water.

42 Claims, No Drawings

ACRYLIC-BASED AQUEOUS ADHESIVE

FIELD OF THE INVENTION

This invention relates generally to an acrylic-based aqueous adhesive. More particularly, the invention is directed to an adhesive formulation containing an acrylic polymer and water, and other ingredients which make the resultant composition useful in the construction industry for adhering structural and decorative panels to a wooden building substrate.

BACKGROUND OF THE INVENTION

This inventive formulation is generally considered a "contact adhesive;" i.e., it is applied to at least one of the surfaces of the items to be adhered together, and the items are thereafter brought into contact under pressure. The adhesive hardens to form an adhesive layer intermediate the items, thus forming a durable bond therebetween.

Adhesives are well-known in the construction industry as useful for bonding building panels to a wooden substrate. Many conventional adhesives, however, experience shrinkage, and thus allow delamination of the panels away from the wooden building substrate.

It would be desirable to prepare an acrylic-based aqueous adhesive which would resist shrinkage and delamination.

SUMMARY OF THE INVENTION

Accordant with the present invention, an improved acrylic-based aqueous adhesive has surprisingly been discovered. It comprises:

from about 18 to about 30 weight percent acrylic polymer;

from about 1.5 to about 2.5 weight percent propylene glycol;

from about 25 to about 40 weight percent calcium carbonate;

from about 0.2 to about 0.4 weight percent organic defoamer;

from about 0.1 to about 0.2 weight percent biocide;

from about 0.2 to about 0.4 weight percent hydrocarbon solvent;

from about 1.3 to about 2 weight percent thickener;

from about 3 to about 7 weight percent sand; and water.

The acrylic-based aqueous adhesive according to the present invention is particularly well suited for use in the construction industry, for adhering decorative and structural panels to a wooden building substrate.

DETAILED DESCRIPTION OF THE PREFERRED EMBODIMENT

The acrylic-based aqueous adhesive according to the present invention comprises acrylic polymer, propylene glycol, calcium carbonate, organic defoamer, biocide, hydrocarbon solvent, thickener, sand, and water.

Acrylic polymers are well-known components of adhesive formulations. Such ingredients are primarily responsible for the tack or quick stick characteristics of the inventive acrylic-based aqueous adhesive according to the present invention. Acrylic polymers suitable for use in the present inventive formulation include, but are not necessarily limited to, methyl acrylate, ethyl acrylate, propyl acrylate, isopropyl acrylate, n-butyl acrylate, sec-butyl acrylate, isobutyl acrylate, tert-butyl acrylate, hexyl acrylate, heptyl acrylate, 2-heptyl acrylate, 2-ethylhexyl acrylate, 2-ethylbutyl acrylate, dodecyl acrylate, hexadecyl acrylate, 2-ethoxyethyl acrylate, isobornyl acrylate, cyclohexyl acrylate, and the like, as well as blends, copolymers, and derivatives thereof. A preferred acrylic polymer is available from Rohm & Haas Company under the trade designation "EL-2000." Acrylic polymer may be present in the acrylic-based aqueous adhesive formulation at a concentration from about 18 to about 30 weight percent. Preferably, the concentration ranges from about 20 to about 25 weight percent. Most preferably, the concentration of acrylic polymer is about 24 weight percent.

Propylene glycol is a conventional material which is present in the acrylic-based aqueous formulation according to the present invention as a wet edge agent; i.e., it prevents the adhesive from drying too quickly, and improves the trowelability of the adhesive onto the surfaces of the components to be joined. The propylene glycol may be present in the inventive formulation at a concentration from about 1.5 to about 2.5 weight percent. Preferably, the concentration of propylene glycol is about 2 weight percent.

Calcium carbonate is a well-known material which is present in the acrylic-based aqueous adhesive formulation according to the present invention as an extender for increasing the viscosity of the material. Also contemplated as having the same operability and utility in the present formulation is calcium carbonate which contains up to about 20 percent by weight other carbonates such as, for example, magnesium carbonate, sodium carbonate, lithium carbonate, and the like, as well as mixtures thereof. The calcium carbonate may be present in the inventive acrylic-based aqueous adhesive at a concentration from about 25 to about 40 weight percent. Preferably, the concentration ranges from about 30 to about 34 weight percent. Most preferably, the concentration of calcium carbonate is about 31.7 weight percent.

An organic defoamer is present in the acrylic-based aqueous adhesive formulation according to the present invention. Organic defoamers are well-known in the art, and include, but are not necessarily limited to petroleum hydrocarbons, 2-octanol, sulfonated oils, organic phosphates, silicone fluids, dimethylpolysiloxane, and the like, as well as blends thereof. A preferred organic defoamer is a petroleum hydrocarbon available from Rhone-Poulenc under the trade designation "COLLOID 643." The organic defoamer may be present in the inventive acrylic-based aqueous adhesive formulation at a concentration from about 0.2 to about 0.4 weight percent. Preferably, the concentration ranges from about 0.25 to about 0.35 weight percent. Most preferably, the concentration of organic defoamer is about 0.3 weight percent.

A biocide is present in the acrylic-based aqueous adhesive formulation according to the present invention to inhibit the growth of microorganisms such as, for example, bacteria, molds, slimes, fungi, etc. Conventional biocides useful for preparing the inventive adhesive formulation include, but are not necessarily limited to, ammonium compounds such as, for example, 2[(hydroxymethyl)amino]ethanol, chlorinated hydrocarbons, organometalics, metallic salts, phenolics, and the like. A preferred biocide is 2[(hydroxymethyl)amino]ethanol. The biocide may be present in the acrylic-based aqueous adhesive formulation according to the present invention at a concentration from about 0.1 to about 0.2 weight percent. Preferably, the concentration of biocide is about 0.15 weight percent.

A solvent is present in the inventive acrylic-based aqueous adhesive, for solubilizing the organic components of the formulation. Conventional solvents which are useful in the present formulation include, but at not necessarily limited to, ester alcohols, aromatic hydrocarbons, esters, ethers, and the like, as well as mixtures and derivatives thereof. A preferred solvent is 2,2,4-trimethyl-1-3-pentanediol mono(2-methylpropanoate); an ester alcohol. The solvent may be present in the inventive acrylic-based aqueous adhesive at a concentration from about 0.2 to about 0.4 weight percent. Preferably, the concentration ranges from about 0.25 to about 0.35 weight percent. Most preferably, the concentration of solvent is about 0.3 weight percent.

A thickener is present in the acrylic-based aqueous adhesive according to the present invention, to improve the initial tack, thus providing a shorter time period from when the adhesive is applied to when the components to be bonded may be physically joined together. Useful thickeners may include carboxy polymers, polyvinyl alcohols, cellulosic materials, and the like, as well as blends and derivatives thereof. A preferred carboxy polymer-based thickener is available from Rohm & Haas under the trade designation "WHT-100." The thickener may be present in the acrylic-based aqueous adhesive at a concentration from about 1.3 to about 2 weight percent. Preferably, the concentration is about 1.6 weight percent.

Sand is an ingredient of the acrylic-based aqueous adhesive formulation according to the present invention. The sand acts as a filler, and more importantly aids the removal of the adhesive from the mixing device and therefore facilitates its application to the surfaces to be joined. The sand may be present in the acrylic-based aqueous adhesive at a concentration from about 3 to about 7 weight percent. Preferably, the concentration ranges from about 3.5 to about 5 weight percent. Most preferably, the concentration of sand is about 4 weight percent. A preferred sand may be obtained from US Silica under the product designation "50 MESH SAND."

Water comprises the balance of the acrylic-based adhesive formulation.

Other conventional adhesive adjuvants may be added to the inventive acrylic-based aqueous adhesive formulation in small quantities up to about 2 weight percent. For example, lamp black may be added to the formulation as a colorant. Other adjuvants may include lubricants, flame retardants, corrosion inhibiters, and the like.

In operation, the ingredients are joined together in conventional mixing equipment, and blended for a period of time sufficient to form a homogeneous mixture. Thereafter, the adhesive may be removed from the mixing equipment and troweled onto the surface of the wooden building substrate, the structural or decorative panel, or both. Following a brief period of time, lasting no more than several minutes in length, the surfaces are joined together under pressure, after which the acrylic-based aqueous adhesive hardens to form a secure bond.

EXAMPLE

The following ingredients are mixed together in the approximate weight percentages indicated, to prepare an acrylic-based aqueous adhesive formulation, according to the present invention. The adhesive is thereafter troweled onto the surface of a wooden building substrate. After a few minutes, a decorative panel is pressed against the adhesive coating. Within an hour, the adhesive layer hardens to form a secure bond between the panel and the substrate.

TABLE

ACRYLIC-BASED AQUEOUS ADHESIVE

| Ingredient | Weight Percent |
| --- | --- |
| Acrylic Polymer (1) | 24 |
| Propylene Glycol | 2 |
| Calcium Carbonate | 31.7 |
| Organic Defoamer (2) | 0.3 |
| Biocide (3) | 0.15 |
| Solvent (4) | 0.3 |
| Thickener (5) | 1.6 |
| Sand (6) | 4 |
| Lamp Black | 0.02 |
| Water | balance |

(1) contained in EL-2000, Rohm & Haas
(2) COLLOID 643, Rhone Poulenc
(3) 2[(hydroxymethyl)amino]ethanol
(4) 2,2,4-trimethyl-1-3-pentanediol mono(2-methylpropanoate)
(5) WHT-100, Rohm & Haas
(6) 50 mesh This Example may be repeated with similar success by substituting the generically or specifically described ingredients and concentrations recited herein for those set forth in the above-described formulation.

From the foregoing description, one ordinarily skilled in the art can easily ascertain the essential characteristics of this invention and, without departing from its spirit and scope, can make various changes and/or modification to adapt the invention to various uses and conditions.

What is claimed is:

1. An acrylic-based aqueous adhesive, comprising:
   from about 18 to about 30 weight percent acrylic polymer;
   from about 1.5 to about 2.5 weight percent propylene glycol;
   from about 25 to about 40 weight percent calcium carbonate;
   from about 0.2 to about 0.4 weight percent organic defoamer;
   from about 0.1 to about 0.2 weight percent biocide;
   from about 0.2 to about 0.4 weight percent hydrocarbon solvent;
   from about 1.3 to about 2 weight percent thickener;
   from about 3 to about 7 weight percent sand; and
   water.

2. The acrylic-based aqueous adhesive according to claim 1, wherein the acrylic polymer comprises methyl acrylate, ethyl acrylate, propyl acrylate, isopropyl acrylate, n-butyl acrylate, sec-butyl acrylate, isobutyl acrylate, tert-butyl acrylate, hexyl acrylate, heptyl acrylate, 2-heptyl acrylate, 2-ethylhexyl acrylate, 2-ethylbutyl acrylate, dodecyl acrylate, hexadecyl acrylate, 2-ethoxyethyl acrylate, isobornyl acrylate, cyclohexyl acrylate, or a blend, copolymer, or derivative thereof.

3. The acrylic-based aqueous adhesive according to claim 1, wherein the concentration of acrylic polymer ranges from about 20 to about 25 weight percent.

4. The acrylic-based aqueous adhesive according to claim 1, wherein the concentration of acrylic polymer is about 24 weight percent.

5. The acrylic-based aqueous adhesive according to claim 1, wherein the concentration of propylene glycol is about 2 weight percent.

6. The acrylic-based aqueous adhesive according to claim 1, wherein the calcium carbonate includes up to about 20 weight percent of magnesium carbonate, sodium carbonate, lithium carbonate, or a mixture thereof.

7. The acrylic-based aqueous adhesive according to claim 1, wherein the concentration of calcium carbonate ranges from about 30 to about 34 weight percent.

8. The acrylic-based aqueous adhesive according to claim 1, wherein the concentration of calcium carbonate is about 31.7 weight percent.

9. The acrylic-based aqueous adhesive according to claim 1, wherein the organic defoamer comprises a petroleum hydrocarbon, 2-octanol, a sulfonated oil, an organic phosphate, a silicone fluid, or dimethylpolysiloxane.

10. The acrylic-based aqueous adhesive according to claim 9, wherein the organic defoamer comprises a petroleum hydrocarbon.

11. The acrylic-based aqueous adhesive according to claim 1, wherein the concentration of organic defoamer ranges from about 0.25 to about 0.35 weight percent.

12. The acrylic-based aqueous adhesive according to claim 1, wherein the concentration of organic defoamer is about 0.3 weight percent.

13. The acrylic-based aqueous adhesive according to claim 1, wherein the biocide comprises an ammonium compound, a chlorinated hydrocarbon, an organometallic, a metal salt, or a phenolic.

14. The acrylic-based aqueous adhesive according to claim 1, wherein the biocide comprises 2[(hydroxymethyl) amino]ethanol.

15. The acrylic-based aqueous adhesive according to claim 1, wherein the concentration of biocide is about 0.15 weight percent.

16. The acrylic-based aqueous adhesive according to claim 1, wherein the solvent comprises an ester alcohol, an aromatic hydrocarbon, an ester, an ether, or a mixture or derivative thereof.

17. The acrylic-based aqueous adhesive according to claim 1, wherein the solvent comprises 2,2,4-trimethyl-1-3-pentanediol mono(2-methylpropanoate).

18. The acrylic-based aqueous adhesive according to claim 1, wherein the concentration of solvent ranges from about 0.25 to about 0.35 weight percent.

19. The acrylic-based aqueous adhesive according to claim 1, wherein the concentration of solvent is about 0.3 weight percent.

20. The acrylic-based aqueous adhesive according to claim 1, wherein the thickener comprises a carboxy polymer, a polyvinyl alcohol, a cellulosic material, or a blend or derivative thereof.

21. The acrylic-based aqueous adhesive according to claim 1, wherein the concentration of thickener is about 1.6 weight percent.

22. The acrylic-based aqueous adhesive according to claim 1, wherein the sand comprises about 50 mesh sand.

23. The acrylic-based aqueous adhesive according to claim 1, wherein the concentration of sand ranges from about 3.5 to about 5 weight percent.

24. The acrylic-based aqueous adhesive according to claim 1, wherein the concentration of sand is about 4 weight percent.

25. The acrylic-based aqueous adhesive according to claim 1, further comprising lamp black.

26. The acrylic-based aqueous adhesive according to claim 25, wherein the concentration of lamp black is about 0.02 weight percent.

27. An acrylic-based aqueous adhesive, comprising:
   from about 20 to about 25 weight percent acrylic polymer, said acrylic polymer comprising methyl acrylate, ethyl acrylate, propyl acrylate, isopropyl acrylate, n-butyl acrylate, sec-butyl acrylate, isobutyl acrylate, tert-butyl acrylate, hexyl acrylate, heptyl acrylate, 2-heptyl acrylate, 2-ethylhexyl acrylate, 2-ethylbutyl acrylate, dodecyl acrylate, hexadecyl acrylate, 2-ethoxyethyl acrylate, isobornyl acrylate, cyclohexyl acrylate, or a blend, copolymer, or derivative thereof;
   from about 1.5 to about 2.5 weight percent propylene glycol;
   from about 30 to about 34 weight percent calcium carbonate, said calcium carbonate including up to about 20 weight percent magnesium carbonate, sodium carbonate, lithium carbonate, or a mixture thereof;
   from about 0.25 to about 0.35 weight percent organic defoamer, said organic defoamer comprising a petroleum hydrocarbon, 2-octanol, a sulfonated oil, an organic phosphate, a silicone fluid, or dimethylpolysiloxane;
   from about 0.1 to about 0.2 weight percent biocide, said biocide comprising an ammonium compound, a chlorinated hydrocarbon, an organometallic, a metal salt, or a phenolic;
   from about 0.25 to about 0.35 weight percent solvent, said solvent comprising an ester alcohol, an aromatic hydrocarbon, an ester, an ether, or a mixture or derivative thereof;
   from about 1.3 to about 2 weight percent thickener, said thickener comprising a carboxy polymer, a polyvinyl alcohol, a cellulosic material, or a blend or derivative thereof;
   from about 3.5 to about 5 weight percent 50 mesh sand; and
   water.

28. The acrylic-based aqueous adhesive according to claim 27, wherein the concentration of acrylic polymer is about 24 weight percent.

29. The acrylic-based aqueous adhesive according to claim 27, wherein the concentration of propylene glycol is about 2 weight percent.

30. The acrylic-based aqueous adhesive according to claim 27, wherein the concentration of calcium carbonate is about 31.7 weight percent.

31. The acrylic-based aqueous adhesive according to claim 27, wherein the organic defoamer comprises a petroleum hydrocarbon.

32. The acrylic-based aqueous adhesive according to claim 27, wherein the concentration of organic defoamer is about 0.3 weight percent.

33. The acrylic-based aqueous adhesive according to claim 27, wherein the biocide comprises 2[(hydroxymethyl) amino]ethanol.

34. The acrylic-based aqueous adhesive according to claim 27, wherein the concentration of biocide is about 0.15 weight percent.

35. The acrylic-based aqueous adhesive according to claim 27, wherein the solvent comprises 2,2,4-trimethyl-1-3-pentanediol mono(2-methylpropanoate).

36. The acrylic-based aqueous adhesive according to claim 27, wherein the concentration of solvent is about 0.3 weight percent.

37. The acrylic-based aqueous adhesive according to claim 27, wherein the concentration of thickener is about 1.6 weight percent.

38. The acrylic-based aqueous adhesive according to claim 27, wherein the concentration of sand is about 4 weight percent.

39. The acrylic-based aqueous adhesive according to claim 27, further comprising lamp black.

40. An acrylic-based aqueous adhesive, comprising:

about 24 weight percent acrylic polymer, said acrylic polymer comprising methyl acrylate, ethyl acrylate, propyl acrylate, isopropyl acrylate, n-butyl acrylate, sec-butyl acrylate, isobutyl acrylate, tert-butyl acrylate, hexyl acrylate, heptyl acrylate, 2-heptyl acrylate, 2-ethylhexyl acrylate, 2-ethylbutyl acrylate, dodecyl acrylate, hexadecyl acrylate, 2-ethoxyethyl acrylate, isobornyl acrylate, cyclohexyl acrylate, or a blend, copolymer, or derivative thereof;

about 2 weight percent propylene glycol;

about 31.7 weight percent calcium carbonate, said calcium carbonate including up to about 20 weight percent magnesium carbonate, sodium carbonate, lithium carbonate, or a mixture thereof;

about 0.3 weight percent organic defoamer, said organic defoamer comprising a petroleum hydrocarbon;

about 0.15 weight percent biocide, wherein the biocide comprises 2[(hydroxymethyl)amino]ethanol;

about 0.3 weight percent solvent, said solvent comprising 2,2,4-trimethyl-1-3-pentanediol mono(2-methylpropanoate);

about 1.6 weight percent thickener, said thickener comprising a carboxy polymer, a polyvinyl alcohol, a cellulosic material, or a blend or derivative thereof;

about 4 weight percent 50 mesh sand; and water.

41. The acrylic-based aqueous adhesive according to claim 40, further comprising lamp black.

42. The acrylic-based aqueous adhesive according to claim 41, wherein the concentration of lamp black is about 0.02 weight percent.

\* \* \* \* \*